United States Patent
Bian et al.

(10) Patent No.: US 12,113,470 B2
(45) Date of Patent: Oct. 8, 2024

(54) METHOD FOR COCONSTANT TORQUE CONTROL OF EC MOTOR IN VENTILATION SYSTEM

(71) Applicant: Zhongshan Broad-Ocean Motor Co., Ltd., Zhongshan (CN)

(72) Inventors: Wenqing Bian, Zhongshan (CN); Xiansheng Zhang, Zhongshan (CN); Jinren Guan, Zhongshan (CN)

(73) Assignee: ZHONGSHAN BROAD-OCEAN MOTOR CO., LTD., Zhongshan (CN)

( * ) Notice: Subject to any disclaimer, the term of this patent is extended or adjusted under 35 U.S.C. 154(b) by 188 days.

(21) Appl. No.: 18/083,449

(22) Filed: Dec. 16, 2022

(65) Prior Publication Data

US 2023/0327585 A1 Oct. 12, 2023

(30) Foreign Application Priority Data

Apr. 8, 2022 (CN) .......................... 202210365015.2

(51) Int. Cl.
*H02P 6/08* (2016.01)
(52) U.S. Cl.
CPC ..................... *H02P 6/08* (2013.01)
(58) Field of Classification Search
CPC .................. H02P 27/06; H02P 6/08
See application file for complete search history.

(56) References Cited

U.S. PATENT DOCUMENTS

| | | | |
|---|---|---|---|
| 4,500,821 A | 2/1985 | Bitting et al. | |
| 2015/0233380 A1* | 8/2015 | Sasaki | F04D 27/004 318/474 |

FOREIGN PATENT DOCUMENTS

| | | |
|---|---|---|
| CN | 104052343 A | 9/2014 |
| CN | 105378390 A | 3/2016 |
| CN | 108282057 A | 7/2018 |
| CN | 113659790 A | 11/2021 |
| IN | 110815217 A | 2/2020 |
| JP | H10243679 A | 9/1998 |
| JP | 2011239660 A | 11/2011 |

OTHER PUBLICATIONS

Zhiying Xie, Application of Renesas Advanced Motor Control Algorithm Based on RX in Air Conditioning Control, Mechanical and electrical information, 2016, pp. 47 & 49, vol. 21-483, Jiangsu Electromechanical Information Magazine Co., Ltd., Nanjing, China.

* cited by examiner

*Primary Examiner* — Antony M Paul
(74) *Attorney, Agent, or Firm* — MATTHIAS SCHOLL P.C.; Matthias Scholl

(57) ABSTRACT

A method for constant torque control of an EC motor of a ventilation system includes: defining a maximum speed spd_max_ref and a minimum speed spd_min_ref of an electronically commutated motor (ECM) within a constant-torque operation range; by using a proportional integral (PI) controller, calculating an upper reference torque T_ref_up with the maximum speed spd_max_ref as a first reference speed, and calculating a lower reference torque T_ref_low with the minimum speed spd_min_ref as a second reference speed; and T_ref_up>T_ref_low; receiving an externally input torque command Tcom; comparing the torque command Tcom, the upper reference torque T_ref_up, and the lower reference torque T_ref_low to determine a target torque Tact; and controlling the ECM to operate in a constant torque mode under the target torque Tact.

12 Claims, 8 Drawing Sheets

METHOD FOR COCONSTANT TORQUE CONTROL OF EC MOTOR IN VENTILATION SYSTEM

CROSS-REFERENCE TO RELAYED APPLICATIONS

Pursuant to 35 U.S.C.§ 119 and the Paris Convention Treaty, this application claims foreign priority to Chinese Patent Application No. 202210365015.2 filed Apr. 8, 2022, the contents of which, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, MA 02142.

BACKGROUND

The disclosure relates to a method for constant torque control of an EC motor of a ventilation system.

Conventionally, ventilation systems use electronically commutated motors (ECM) as power sources. An electronically commutated motor is also known as a permanent magnet synchronous and brushless DC motor. EC motors are classified into three types based on their operating conditions: constant speed motors, constant torque motors, and constant air volume motors. The constant torque motors are the most common type of EC motors. Vector control is a common method used in the constant torque motors, despite the fact that it necessitates a complex mathematical model, complicated calculations, and an expensive and powerful CPU.

The following disadvantages are associated with the constant torque motors. For example, when the EC motor operates in a constant torque mode, with the increase of the static pressure of the system, the load requires less torque, and thus the load speed increases continuously. At high speeds, the EC motor vibrates excessively and makes big noise, which is unfriendly to users and causes mechanical fatigue, reducing the service life of motor components. On the contrary, when the static pressure decreases, the load requires more torque. However, because the output torque is constant, the load speed decreases continuously, and thus the air output is reduced, leading to bad user experience.

SUMMARY

The disclosure provides a method for constant torque control of an EC motor of a ventilation system, and the method comprises:
1). defining a maximum speed spd_max_ref and a minimum speed spd_min_ref of an electronically commutated motor (ECM) within a constant-torque operation range;
2). by using a proportional integral (PI) controller, calculating an upper reference torque T_ref_up with the maximum speed spd_max_ref as a first reference speed, and calculating a lower reference torque T_ref_low with the minimum speed spd_min_ref as a second reference speed; and T_ref_up>T_ref_low;
3). receiving an externally input torque command Tcom;
4). comparing the torque command Tcom, the upper reference torque T_ref_up, and the lower reference torque T_ref_low to determine a target torque Tact; and
5). controlling the ECM to operate in a constant torque mode under the target torque Tact.

In a class of this embodiment, in 4), if Tcom is greater than T_ref_up, let Tact=T_ref_up; if Tcom is less than T_ref_low, let Tact=T_ref_low; if Tcom falls between T_ref_up and T_ref_low, let Tact=Tcom.

In a class of this embodiment, in 2), by using the PI controller, an upper integral value interger_up is also acquired with the maximum speed spd_max_ref as the first reference speed, and a lower integral value interger_low with the minimum speed spd_min_ref as the second reference speed; in 4), if Tcom is greater than T_ref_up, let Tact=T_ref_up, and interger_up=Tact; if Tcom is less than T_ref_low, let Tact=T_ref_low, and interger_low=Tact; if Tcom falls between T_ref_up and T_ref_low, let Tact=Tcom, and interger_low=Tact, interger_up=Tact.

In a class of this embodiment, between 4) and 5), the method further comprises: calculating a maximum output torque Tmax based on a rotational speed SPD and a maximum output power of the EC motor; and comparing Tact with Tmax; if Tact is greater than Tmax, let Tact=Tmax.

In a class of this embodiment, the maximum output torque Tmax is calculated from the rotational speed SPD and the maximum output power P_out_max.

In a class of this embodiment, a dynamometer is used to ensure the EC motor operates at the maximum output power P_out_max, and the EC motor produces the maximum output torque Tmax through adjusting rotational speed SPD.

The following advantages are associated with the EC motor of the disclosure: 1. The disclosed EC motor uses an externally input torque command from the user to calculate a target torque at which the EC motor can operate smoothly at a full speed. 2. When the EC motor runs at a critical speed, there is no vibration, which improves the user experience and product reliability.

DETAILED DESCRIPTION OF THE DRAWINGS

Figure 1:
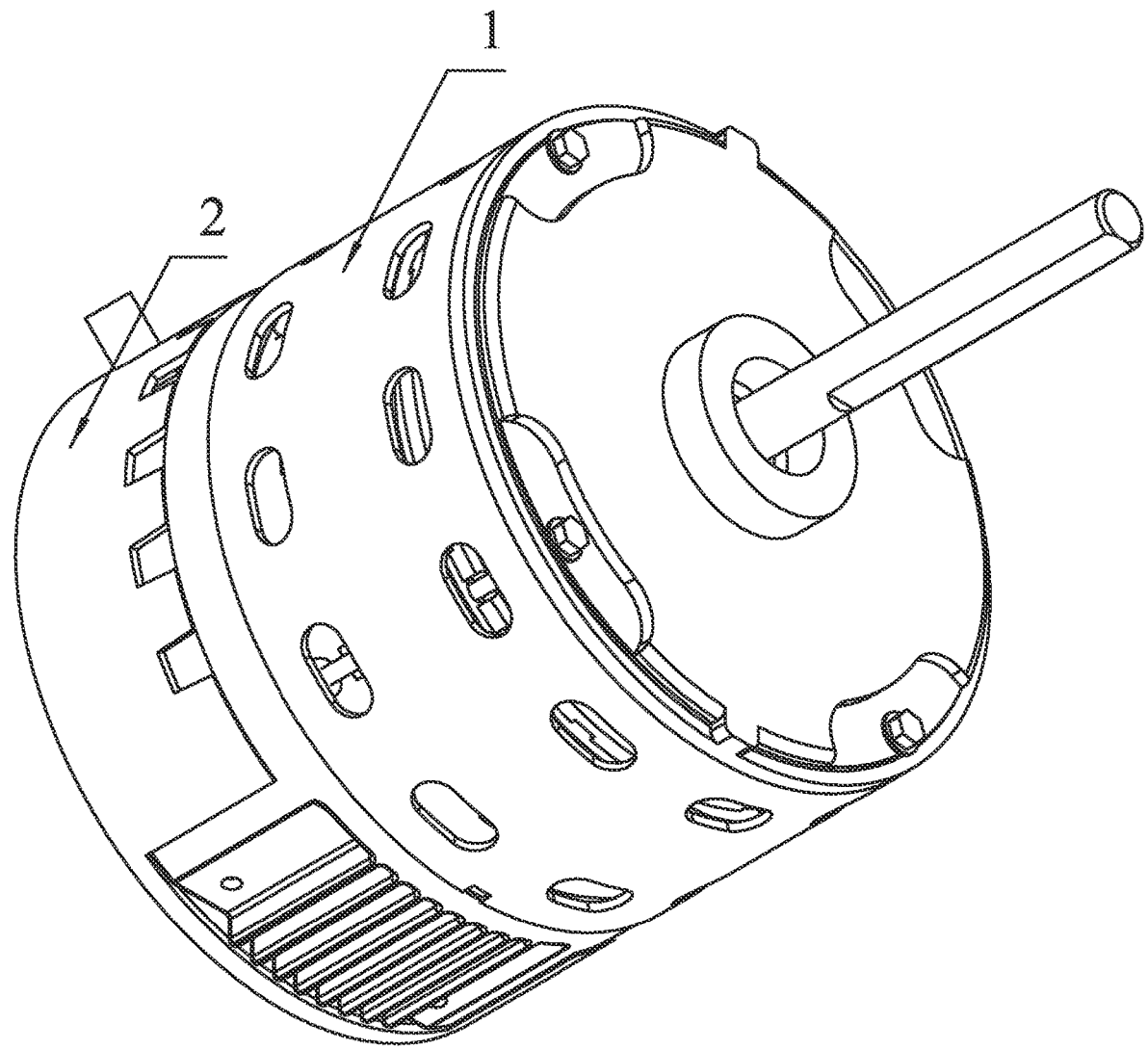
FIG. 1 is a perspective view of an EC motor according to one example of the disclosure.

In the drawings, the following reference numbers are used: 1. Motor body; 2. Motor controller; 11. Housing; 12. Stator assembly; 13. Rotor assembly; 14. Rotor position measurement circuit; 21. Control circuit board; and 22. Control box.

DETAILED DESCRIPTION

To further illustrate the disclosure, embodiments detailing a method for constant torque control of an EC motor of a ventilation system are described below. It should be noted that the following embodiments are intended to describe and not to limit the disclosure.

Figure 2:
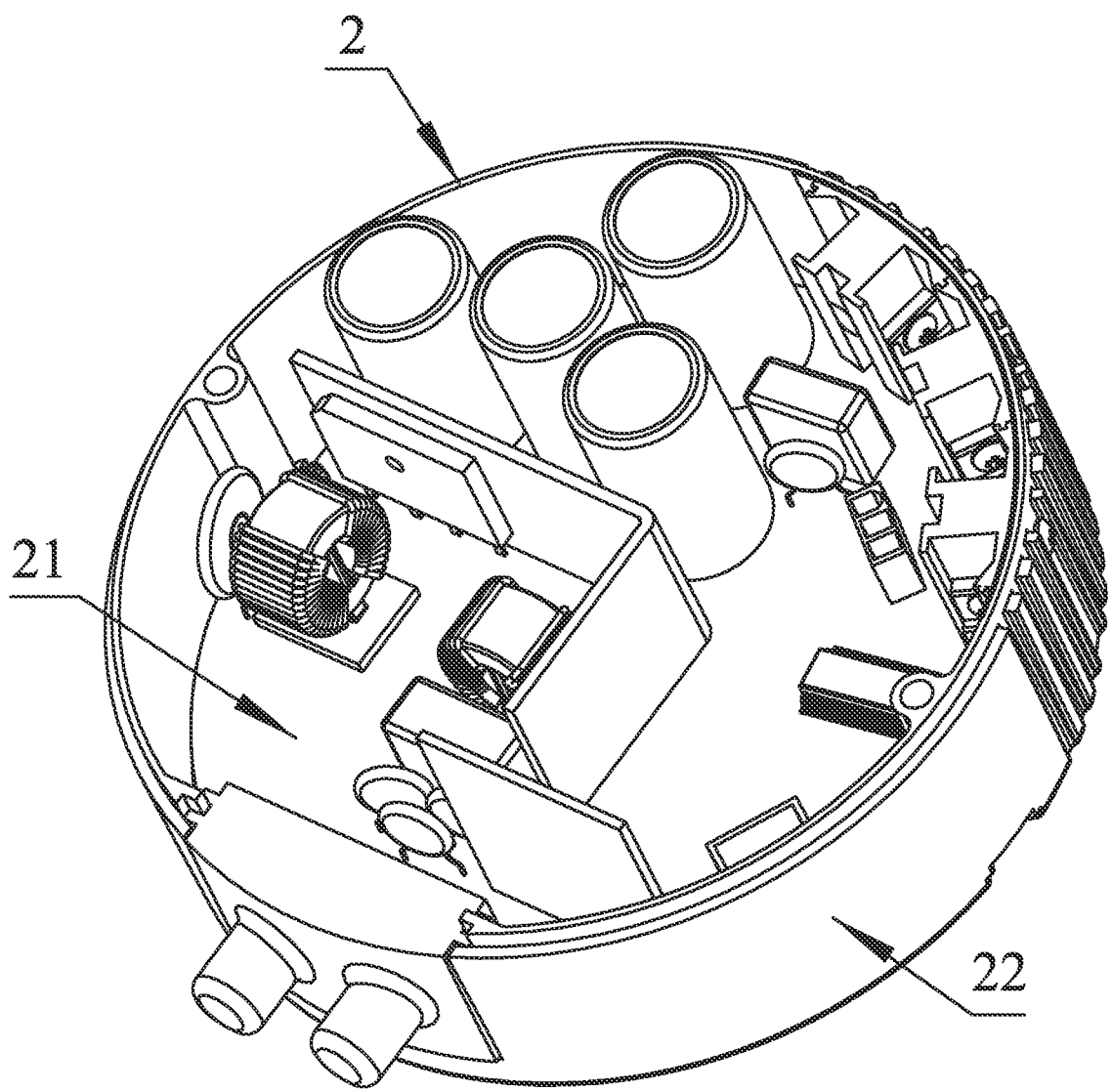
FIG. 2 is a perspective view of a motor controller according to one example of the disclosure.
Figure 3:
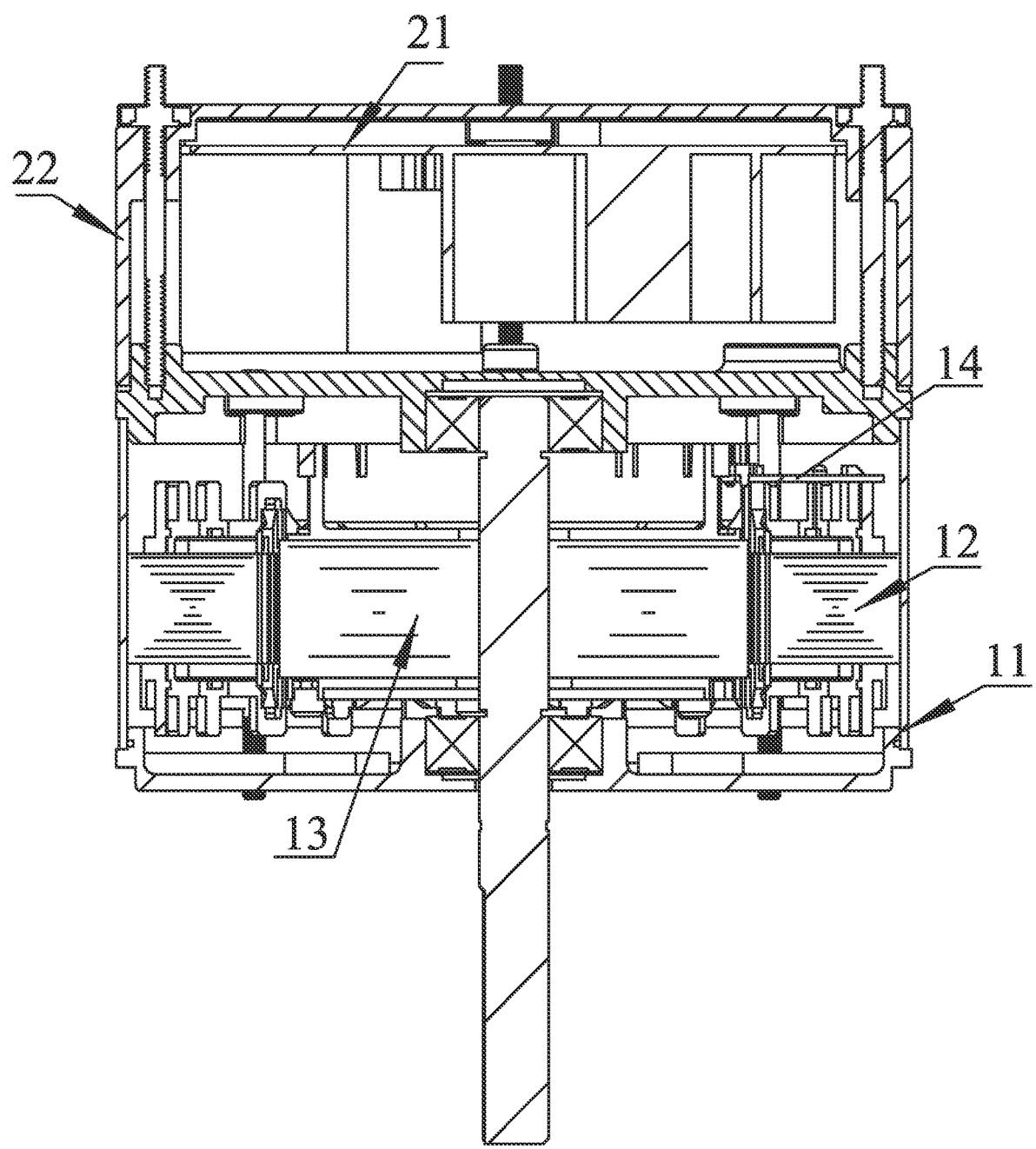
FIG. 3 is a cross sectional view of an EC motor according to one example of the disclosure.

As shown in FIGS. 1-3, an electronically commutated motor (EC motor) comprises a motor controller 2 and a motor body 1. The motor body 1 comprises a stator assembly 12, a rotor assembly 13, and a housing 11. The stator assembly 13 is nested in the housing 11; the motor body 1 further comprises a Hall effect sensor 14 for detecting the position of a rotor. The rotor assembly 13 is nested inside or outside the stator assembly 12. The motor controller 2 comprises a control box 22 and a control circuit board 21 disposed in the control box 22. The control circuit board 21 comprises a power supply circuit, a microprocessor, a bus current measurement circuit, an inverter circuit, and a rotor position measurement circuit 14 (i.e. the Hall effect sensor). The power supply circuit is configured to supply electric power to a set of different loads. The rotor position measurement circuit is configured to detect rotor position data and output it to the microprocessor. The bus current measurement circuit is configured to detect bus current data and output it to the microprocessor. The microprocessor is configured to operate the inverter circuit. The inverter circuit is configured to switch on and off each phase winding in the stator assembly 12. The bus current measurement circuit and the rotor position measurement circuit 14 are main parts of a motor parameter measurement circuit. The microprocessor uses the rotor position data or a phase current through the rotor to calculate a rotational speed SPD of the EC motor. The calculation methods are described in the textbooks on vector control of EC motors, and accordingly not described further herein.

Figure 4:
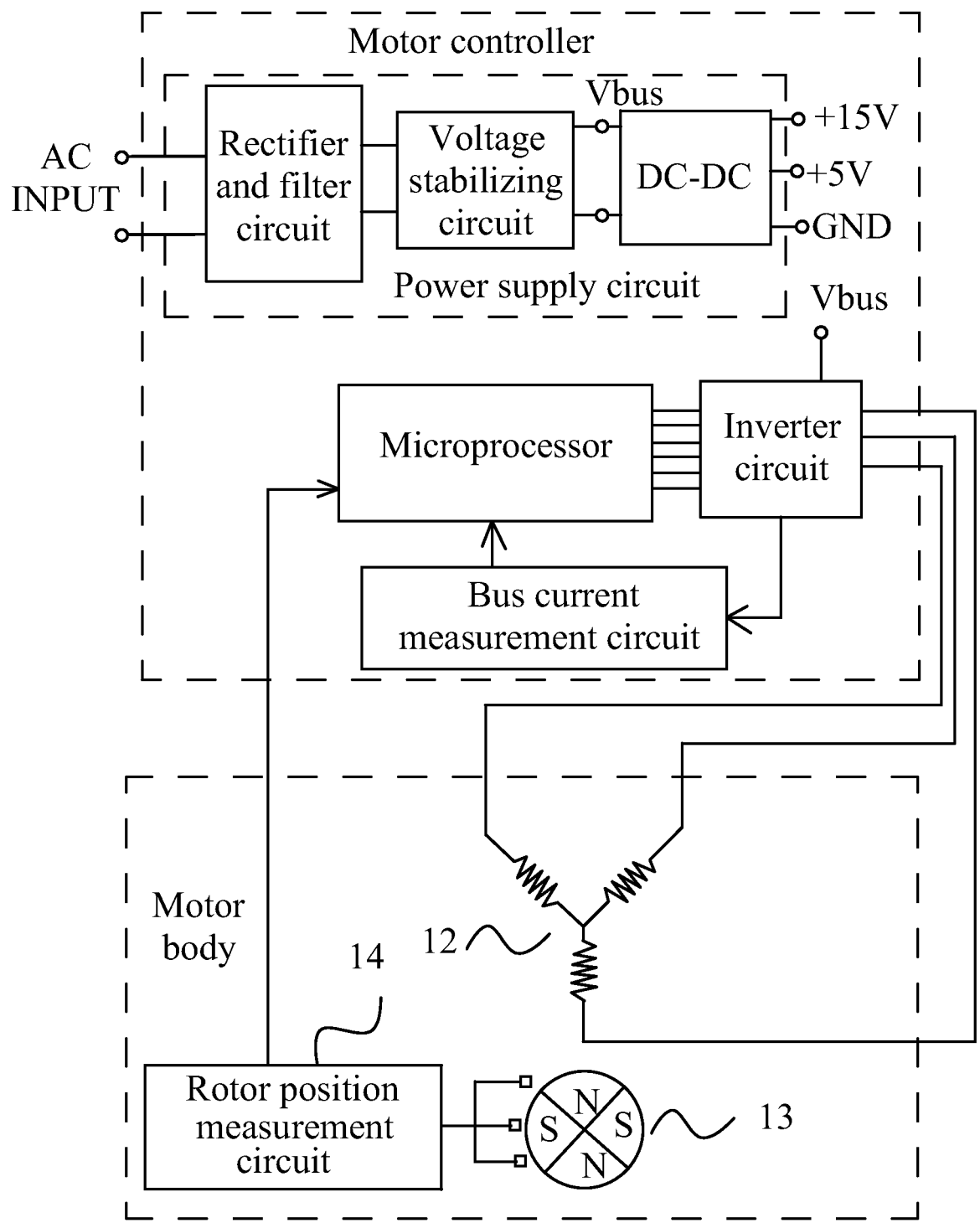
FIG. 4 is a block diagram of an EC motor controller according to one example of the disclosure.
Figure 5:
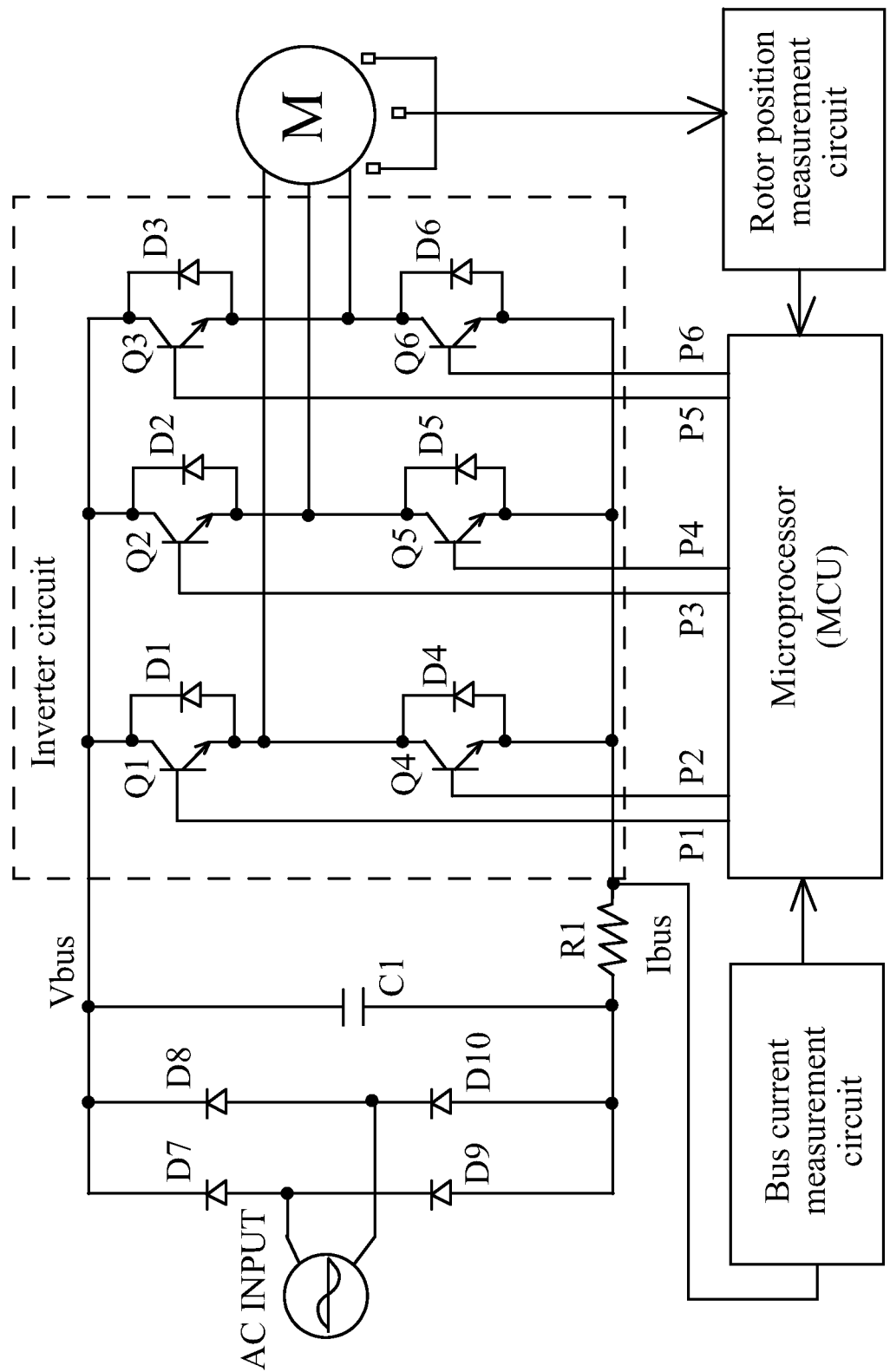
FIG. 5 is a circuit diagram of FIG. 4.

As shown in FIGS. 4-5, the EC motor is a three-phase brushless DC and permanent magnetic synchronous motor. The rotor position measurement circuit 14 comprises three Hall effect sensors, each of which detects the position of the rotor as it rotates 360 electrical degrees. By switching on or off each winding in the rotor assembly every 120 electrical degrees, a three-phase six-step control is achieved. Diodes D7, D8, D9, and D10 are connected together to form a full-wave rectifier that converts input alternating voltage (AC INPUT) to DC bus voltage Vbus. The DC bus voltage Vbus is provided at the output of the capacitor C1 and associated with the input alternating voltage. The input alternating voltage (AC INPUT) is given, the DC bus voltage Vbus is constant, and a linear voltage Vm across the three-phase winding is the PWM chopper output voltage, Vm=Vbus*w, where w is the duty cycle of the PWM signal transferred from the microprocessor to the inverter circuit; the bus DC current Ibus varies with the linear voltage Vm; electronic switches Q1, Q2, Q3, Q4, Q5 and Q6 are connected together to form the inverter circuit. The microprocessor generates six-way PWM signals to control the electronic switches Q1, Q2, Q3, Q4, Q5 and Q6, respectively.

Figure 6:
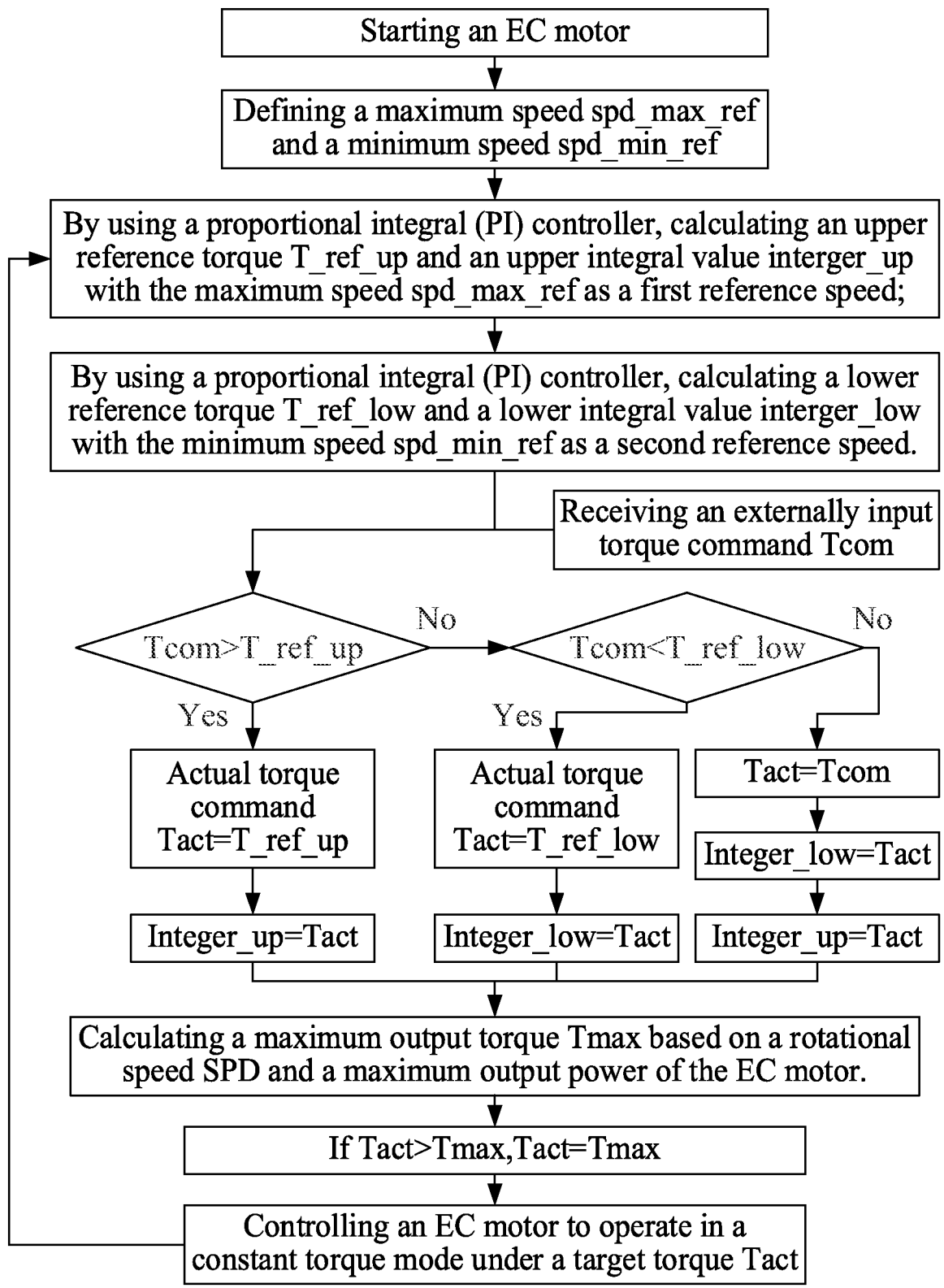
FIG. 6 is a flow chart of a constant torque control of an EC motor according to an example of the disclosure.

As shown in FIG. 6, an example provides a method for constant torque control of an EC motor of a ventilation system, and the method comprises:
1). defining a maximum speed spd_max_ref and a minimum speed spd_min_ref of an electronically commutated motor (ECM) within a constant-torque operation range;
2). by using a proportional integral (PI) controller, calculating an upper reference torque T_ref_up with the maximum speed spd_max_ref as a first reference speed, and calculating a lower reference torque T_ref_low with the minimum speed spd_min_ref as a second reference speed; and T_ref_up>T_ref_low;
3). receiving an externally input torque command Tcom; and
4). comparing the torque command Tcom, the upper reference torque T_ref_up, and the lower reference torque T_ref_low to determine a target torque Tact; and
5). controlling the ECM to operate in a constant torque mode under the target torque Tact.

In 4), if Tcom is greater than T_ref_up, let Tact=T_ref_up; if Tcom is less than T_ref_low, let Tact=T_ref_low; if Tcom falls between T_ref_up and T_ref_low, let Tact=Tcom.

In 2), by using the PI controller, an upper integral value interger_up is also acquired with the maximum speed spd_max_ref as the first reference speed, and a lower integral value interger_low with the minimum speed spd_min_ref as the second reference speed; in 4), if Tcom is greater than T_ref_up, let Tact=T_ref_up, and interger_up=Tact; if Tcom is less than T_ref_low, let Tact=T_ref_low, and interger_low=Tact; if Tcom falls between T_ref_up and T_ref_low, let Tact=Tcom, and interger_low=Tact, interger_up=Tact.

Between 4) and 5), the method further comprises: calculating a maximum output torque Tmax based on a rotational speed SPD and a maximum output power of the EC motor; and comparing Tact with Tmax; if Tact is greater than Tmax, let Tact=Tmax.

The maximum output torque Tmax is calculated from the rotational speed SPD and the maximum output power P_out_max.

A formula used to determine the output of the EC motor is: Tmax=P_out_max/SPD; a dynamometer is used to ensure the EC motor operates at the maximum output power P_out_max, and the EC motor produces the maximum output torque Tmax through adjusting the rotational speed SPD. Understandably, the rotational speed SPD is between the maximum speed spd_max_ref and the minimum speed spd_min_ref. The maximum output torque Tmax is calculated based on the rotational speed SPD and the maximum output power, to limit the target torque Tact, thus ensuring the EC motor operates in a limited power range, preventing the EC motor from getting too hot.

In 5), the EC motor operates to produce the constant target torque Tact. A constant control method for calculating the target torque is disclosed in the patents CN201811334775.7 and CN201510079416.1, as well as in the U.S. Pat. No. 5,220,259(A) filed in 1993, and accordingly not described further herein.

The disclosed EC motor uses an externally input torque command from the user to calculate a target torque at which the EC motor can operate smoothly at a full speed. When the EC motor running at a critical speed, there is no vibration, which improves the user experience and product reliability.

Figure 7:
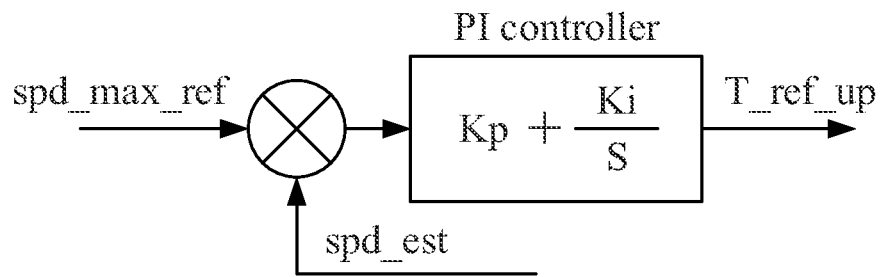
FIG. 7 is a block diagram of a PI controller using spd_max_ref as a reference speed according to one example of the disclosure.
Figure 8:
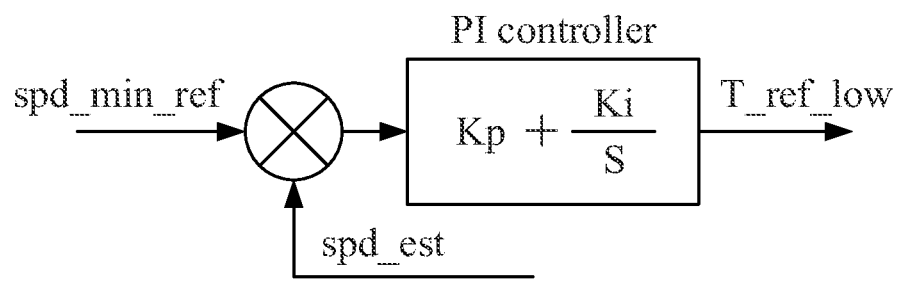
FIG. 8 is a block diagram of a PI controller using spd_min_ref as a reference speed according to one example of the disclosure.

In 2), the PI controller uses the maximum speed spd_max_ref as a reference to calculate a speed error e=spd_max_ref-spd_est from a real-time detected speed spd_est; the proportional gain KP and the integral gain KI of the PI controller are defined as shown in FIG. 7; the output torque of the PI controller is Kp*e+Ki*∫edt=T_ref_up; where Ki*∫edt is the integral value interger_up. In the same way, the PI controller uses the minimum speed spd_min_ref as a reference to calculate a speed error e=spd_min_ref-spd_est from a real-time detected speed spd_est; the proportional gain KP and the integral gain KI of the PI controller are defined as shown in FIG. 8; the output torque of the PI controller is Kp*e+Ki*∫edt=T_ref_up; where Ki*∫edt is the integral value interger_up; and values are assigned to the integral value to keep the PI controller from reaching integral saturation and to make it respond faster to the speed PI control.

Figure 9:
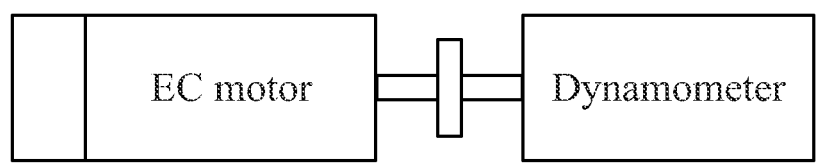
FIG. 9 is a schematic diagram of a motor used with a dynamometer according to one example of the disclosure.
Figure 10:
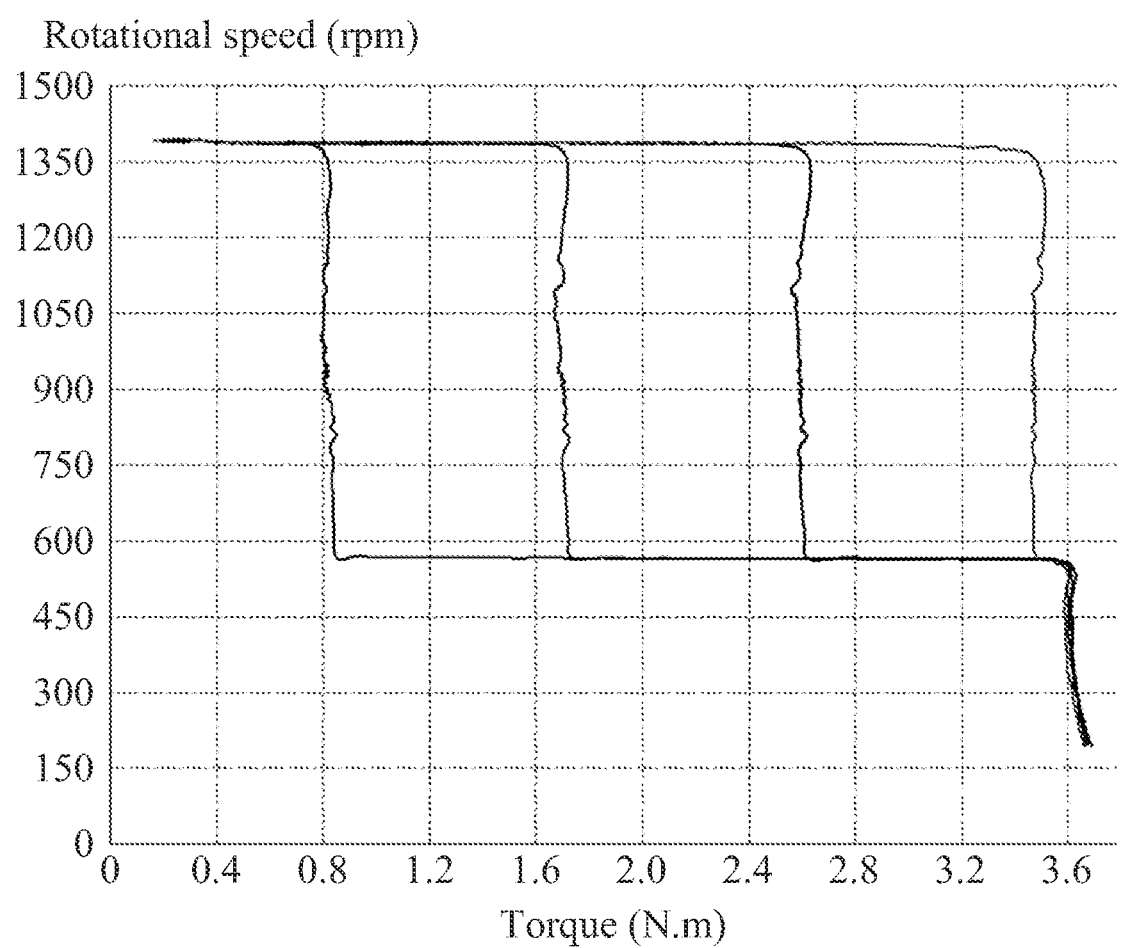
FIG. 10 is a dyno chart of output power and torque over a motor speed range.

The disclosed method is used to control the torque of an EC motor with 0.5 HP and 230V in a constant way. The dynamometer measures the torque of the EC motor at speeds between 570 and 1400 rpm (shown in FIG. 9). FIG. 10 is a dyno chart of output power and torque over the motor speed range. The results indicate that the EC motor runs steadily in the speed range when providing a constant torque of 10, 20, 30 and 40, thus improving the user experience and product reliability. When the EC motor is running at a critical speed, there is no vibration, which enhances the user experience.

It will be obvious to those skilled in the art that changes and modifications may be made, and therefore, the aim in the appended claims is to cover all such changes and modifications.

The invention claimed is:

1. A method, comprising:
   1) defining a maximum speed spd_max_ref and a minimum speed spd_min_ref of an electronically commutated motor (ECM) within a constant-torque operation range;
   2) by using a proportional integral (PI) controller, calculating an upper reference torque T_ref_up with the maximum speed spd_max_ref as a first reference speed, and calculating a lower reference torque T_ref_low with the minimum speed spd_min_ref as a second reference speed; and T_ref_up>T_ref_low;
   3) receiving an externally input torque command Tcom;
   4) comparing the torque command Tcom, the upper reference torque T_ref_up, and the lower reference torque T_ref_low to determine a target torque Tact; and
   5) controlling the ECM to operate in a constant torque mode under the target torque Tact.

2. The method of claim 1, wherein in 4), if Tcom is greater than T_ref_up, let Tact=T_ref_up; if Tcom is less than T_ref_low, let Tact=T_ref_low; if Tcom falls between T_ref_up and T_ref_low, let Tact=Tcom.

3. The method of claim 2, wherein in 2), by using the PI controller, an upper integral value interger_up is also acquired with the maximum speed spd_max_ref as the first reference speed, and a lower integral value interger_low with the minimum speed spd_min_ref as the second reference speed; in 4), if Tcom is greater than T_ref_up, let Tact=T_ref_up, and interger_up=Tact; if Tcom is less than T_ref_low, let Tact=T_ref_low, and interger_low=Tact; if Tcom falls between T_ref_up and T_ref_low, let Tact=Tcom, and interger_low=Tact, interger_up=Tact.

4. The method of claim 3, wherein between 4) and 5), the method further comprises: calculating a maximum output torque Tmax based on a rotational speed SPD and a maximum output power of the EC motor; and comparing Tact with Tmax; if Tact is greater than Tmax, let Tact=Tmax.

5. The method of claim 4, wherein the maximum output torque Tmax is calculated from the rotational speed SPD and the maximum output power P_out_max.

6. The method of claim 5, wherein a dynamometer is used to ensure the EC motor operates at the maximum output power P_out_max, and the EC motor produces the maximum output torque Tmax through adjusting the rotational speed SPD.

7. The method of claim 2, wherein between 4) and 5), the method further comprises: calculating a maximum output torque Tmax based on a rotational speed SPD and a maximum output power of the EC motor; and comparing Tact with Tmax; if Tact is greater than Tmax, let Tact=Tmax.

8. The method of claim 7, wherein the maximum output torque Tmax is calculated from the rotational speed SPD and the maximum output power P_out_max.

9. The method of claim 8, wherein a dynamometer is used to ensure the EC motor operates at the maximum output power P_out_max, and the EC motor produces the maximum output torque Tmax through adjusting the rotational speed SPD.

10. The method of claim 1, wherein between 4) and 5), the method further comprises: calculating a maximum output torque Tmax based on a rotational speed SPD and a maximum output power of the EC motor; and comparing Tact with Tmax; if Tact is greater than Tmax, let Tact=Tmax.

11. The method of claim 10, wherein the maximum output torque Tmax is calculated from the rotational speed SPD and the maximum output power P_out_max.

12. The method of claim 11, wherein a dynamometer is used to ensure the EC motor operates at the maximum output power P_out_max, and the EC motor produces the maximum output torque Tmax through adjusting the rotational speed SPD.

* * * * *